United States Patent [19]
Lindsey

[11] Patent Number: 5,675,801
[45] Date of Patent: Oct. 7, 1997

[54] OBJECT ORIENTED SYSTEM AND METHOD FOR GENERATING TARGET LANGUAGE CODE

[75] Inventor: Anthony Hayden Lindsey, Fuquay Varina, N.C.

[73] Assignee: International Business Machines Corporation, Armonk, N.Y.

[21] Appl. No.: 316,174

[22] Filed: Sep. 30, 1994

[51] Int. Cl.$^6$ .................................................. G06F 17/27
[52] U.S. Cl. ........................................................ 395/702
[58] Field of Search ................................. 395/650, 700, 395/702

[56] References Cited

U.S. PATENT DOCUMENTS

| | | | |
|---|---|---|---|
| 4,827,404 | 5/1989 | Barstow et al. | 395/500 |
| 5,075,851 | 12/1991 | Kugimiya et al. | 395/144 |
| 5,159,687 | 10/1992 | Richburg | 395/700 |
| 5,187,788 | 2/1993 | Marmelstein | 395/703 |
| 5,339,433 | 8/1994 | Frid-Nielsen | 395/700 |
| 5,361,350 | 11/1994 | Conner et al. | 395/650 |
| 5,481,708 | 1/1996 | Kukol | 395/709 |
| 5,493,680 | 2/1996 | Danforth | 395/702 |
| 5,497,319 | 3/1996 | Chong et al. | 395/752 |
| 5,535,120 | 7/1996 | Chong et al. | 395/753 |

OTHER PUBLICATIONS

OOPS Messenger, V5, No. 3, Jul. 1994, New York, U.S., pp. 6–16 Karakostas et al., "Combined Use of Languages in Object Oriented Software Construction".

European Search Report, Application No. EP 95 480120, The Hague, Jan. 11, 1996, J. Brandt.

Knowledge Assisted Software Engineering, CASEWORKS, Inc., 1992.

Implementing Technology Visions . . . Corporate Overview, CASEWORKS, Inc., Atlanta, GA, 1992.

*Primary Examiner*—Kevin A. Kriess
*Assistant Examiner*—John Q. Chavis
*Attorney, Agent, or Firm*—Gregory M. Doudnikoff

[57] ABSTRACT

A system for generating target language source code utilizing an object oriented technology is disclosed. A desired computer programming function is specified using an object oriented user interface. The result is an object oriented model of the desired target language program. The object oriented model is processed by a generator engine, which recursively generates each object in the model, if necessary, to surface all primitive objects relative to the target language contained in the model. Each primitive object is mapped to its corresponding template from a set of source code templates which corresponds to the desired target language, which is typically a third generation language. An object oriented generator engine parses the resulting collection of templates to form source code files having the desired programming function in the desired target language.

15 Claims, 7 Drawing Sheets

OBJECT ORIENTED SYSTEM AND METHOD FOR GENERATING TARGET LANGUAGE CODE

BACKGROUND OF THE INVENTION

1. Summary of the Invention

The present invention is directed toward a system and method for generating source code in a target language utilizing an object oriented user interface and an object oriented generator engine. More particularly, the present invention is directed to a system and method in which a user prototypes desired programming functions utilizing an object oriented user interface to create an object oriented design of the desired programming function. The object oriented design is matched to source code templates for the target language, the templates are parsed by a generator engine, and object oriented code executed to produce source code files in the target language.

2. Description of the Related Art

A commonly held notion in present day computer technology is that developments in computer software lag behind developments in computer hardware. In part, this is certainly due to the relatively large number of computer languages and the wide range of computer programming skills necessary to develop a single robust and complete computer program or application. Today, a robust and complete computer program has multiple requirements. These include a wide range of functionality, a graphical user interface, the ability to access databases, the ability to appropriately utilize and interact with the underlying operating system, etc. Given the reliance on computers in certain fields, such as military and financial, many programs must be able to stand up to the rigors of intensive use. Thus testing of a program must be extensive as well.

The most prominent programming languages in use today are what are known as third generation languages (3GLs), which include such languages as C, Fortran and Cobol. A single programmer or small group of programmers having all the abilities necessary to create a robust application in a 3GL is rare. And while a programmer may be proficient in one language, this does not mean he or she knows anything about any other language.

Given this situation, a number of systems have been developed in recent years which attempt to lower the skill level required to write complex and diverse computer programs. What have become known as case tools and power tools have been developed. Case and power tools often utilize what are known as fourth generation languages (4GLs). In fourth generation languages, syntax is simpler and the programmer must specify fewer statements than if the programmer were coding in a 3GL. Thus, the learning curve for new users is lower. Such tool converts the 4GL code written or input by the programmer into 3GL code which corresponds to the user-defined 4GL functions. Some such tools completely remove the requirement that a programmer be an expert in coding in certain skill areas. For example, it is presently common for a programmer to use a tool to construct a graphical user interface for a program without the programmer having to write a single line of code in a 3GL. The user manipulates the tool's user interface by using a mouse and a series of keystrokes to construct the desired layout of the graphical user interface and the tool generates 3GL code from the 4GL construction.

One problem that has always been associated with the use of 4GLs is less control by the programmer of the actual processing carried out by a 3GL program created with the 4GL. The code that a programmer writes in the 4GL with the case or power tool is more concise but more removed from the actual machine instructions carried out by the computer processor than is code written by a programmer in a 3GL.

The tools in which fourth generation languages have been incorporated, such as the case and power tools mentioned above are also known as source code generators. Traditional source code generator tools receive user input design, which the user inputs in the 4GL, and processes 4GL design utilizing a source code generator engine which outputs source code in a specific target language having functionality corresponding to the input design. The output is typically a 3GL, but can be proprietary language that will be interpreted by a run-time engine during execution. The generator engine basically maps individual components of the 4GL code design input by the user to corresponding predefined source code snippets in the 3GL. The generator engine performs this mapping function for each basic component of the 4GL design code, and outputs source files in the desired target language.

Such generator systems have a number of drawbacks. Traditional systems lack extensibility and are difficult to modify. Attempting to improve or extend the capabilities of the system can be quite complex. The 4GL must be modified, the effected 3GL snippets in the generator engine must be located and modified (which requires detailed knowledge of the generator engine), and new 3GL code snippets added. The resulting engine can be more complex and even less organized.

Additionally, the source code generated by such systems is often only the shell of the 3GL program which is desired by the user. The complexity of mapping the 4GL to the 3GL limits the exactness possible by such systems.

U.S. Pat. No. 5,159,687, which issued to Richburg on Oct. 27, 1992, describes a proprietary 4GL based system which utilizes a number of different knowledge bases which may be used in automatic generation of programming code for different languages. The patent describes an attempt to address the extensibility problem. However, the system described in this patent does not address all of the problems associated with the use of source code generators. Also, users of this system must learn the 4GL, which has little use elsewhere.

A need exists for a source code generator which reduces the reliance on 4GLs and to improve the mapping process so as to permit more precise mapping and thus better control of the generated 3GL source code and its processing functions.

SUMMARY OF THE INVENTION

Accordingly, an object of the present invention is to provide a system for generating source code files which requires a minimum of programmer intervention to obtain the desired functions.

Another object of the present invention is to provide a source code generator which produces source code files which are more complete and more accurately match the desired functions than those produced by using traditional source code generators.

Yet another object of the present invention is to provide a source code generator tool which utilizes a user friendly interface without sacrificing the quality of the resulting source code files.

To achieve the foregoing objects, and in accordance with the purpose of the invention as broadly described herein, in a computing environment, a system is provided for converting an object oriented program specification into source code for a target language, comprising a set of code templates, each code template corresponding to a different construct in the target language and comprising fragments of code; means for determining whether each object in the object oriented program specification correspond to one of the constructs, and, if not, recursively generating any non-corresponding object to generate contained objects, and, if necessary, recursively generating the contained objects to find objects which comprise the non-corresponding object which correspond to one of the constructs; means for mapping each of the corresponding objects to the code templates which corresponds to the corresponding constructs; and means for parsing the mapped code templates to produce source code in the target language.

The system may further comprise an object oriented execution environment for enabling execution of object oriented code, wherein each of said code templates further comprise object oriented code and fragments of source code from the target language, and wherein the parsing means further causes the object oriented code in each of the mapped code templates to be executed with the object oriented execution environment relative to the object oriented program specification to generate additional source code fragments and combines the additional source code fragments with the fragments of source code. A plurality of target languages are available for targeting and a set of code templates is provided for each of the target languages. The system may further comprise means for designating a target language, and wherein the mapping means may map each of the corresponding objects to the corresponding one of the code templates from the set of code templates which correspond to the designated target language. The constructs may be base logic and data components of the target language. A system is also provided for converting an object oriented program into code for a target language, comprising a set of code templates corresponding to each available target language, each of the code templates comprising code fragments in the corresponding target language and object oriented code and each of the code templates corresponding to a different construct in the corresponding target language; an object oriented execution environment capable of executing the object oriented code; means for recursively generating each object in the object oriented program as necessary to find all underlying objects which correspond to the code templates for the target language; mapping means for mapping each of the underlying objects to the corresponding code template for the target language; and means for parsing the mapped code templates to generate code in the target language. The parsing means may extract the code fragments from each mapped code template, execute the object oriented code in each mapped code template to produce an additional code fragment, combine the additional code fragment and the code fragments, and output the combined code. Each of the constructs may correspond to a logic keyword or data keyword in the corresponding target language. The system may further comprise means for designating the target language into which the object oriented program is to be converted.

A method is also provided for converting an object oriented program into a target language, comprising the steps of recursively generating objects from the object oriented program, as necessary, to identify all base objects which have a corresponding source code template for the target language; mapping each of the base objects to the corresponding source code template; and parsing the mapped source code templates to generate source code in the target language. The source code templates may comprise a target language source code portion and an object oriented code portion, and wherein the parsing step may cause the object oriented code portion of each of the source code templates to be executed and combine any response to the execution of the object oriented code portion with the target language source code portion, and output the combined response and source code portion. A plurality of target languages may be available and a set of source code templates is associated with each of the target languages, and the method may further comprise the step of designating the target language into which the object oriented program is to be converted.

These and other features, aspects and advantages of the present invention will become better understood with reference to the following description, appended claims, and accompanying drawings in which like reference numbers denote the same element.

DESCRIPTION OF THE PREFERRED EMBODIMENT

The invention described herein is related to that described in commonly assigned and co-pending U.S. patent application Ser. No. 08/315,743 entitled "System and Method for Generating Target Language Code Utilizing an Object Oriented Code Generator", having the same inventor and filed on even date herewith, which is hereby incorporated by reference in its entirety.

Figure 1:
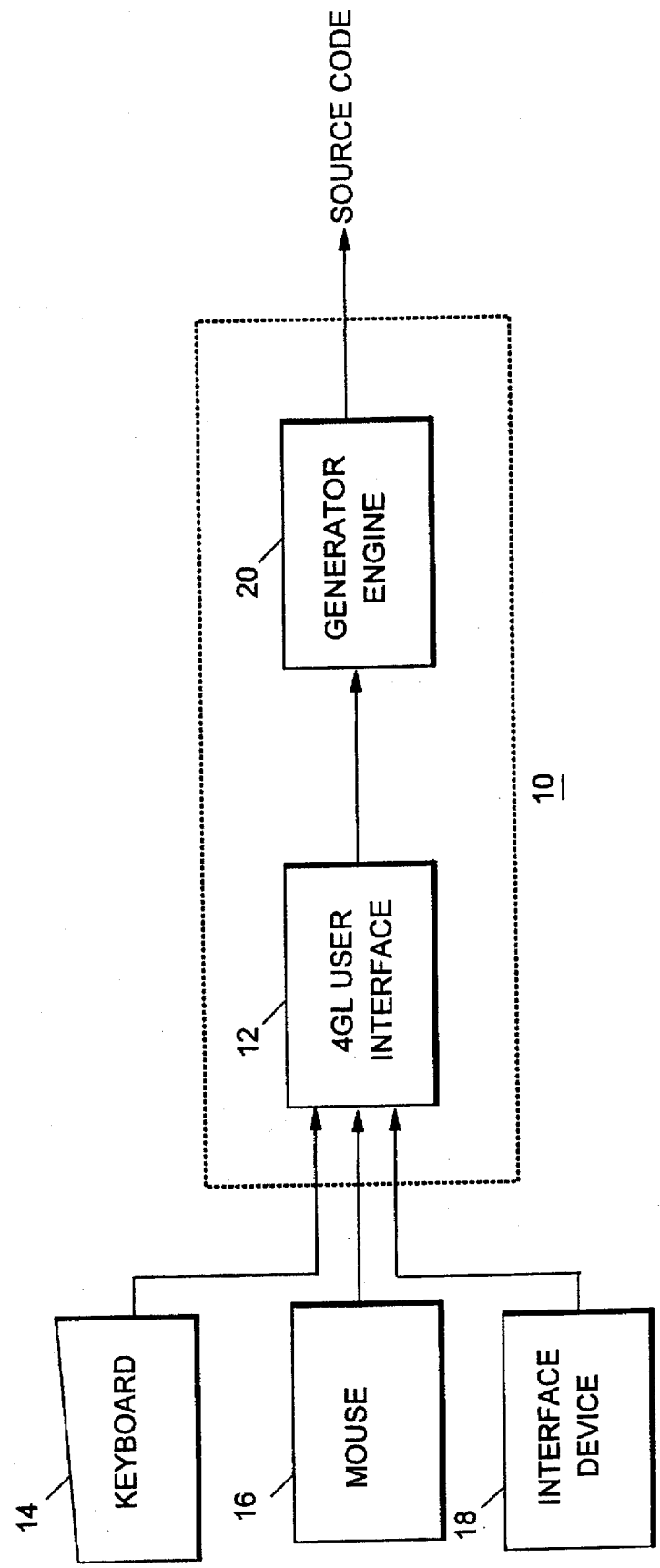
FIG. 1 is a block diagram of a prior art source code generating system.

A prior art source code generating system will now be described with reference to FIG. 1.

In a typical source code generator, a 4GL source code generator tool 10 resident in a computing environment accepts user input via its 4GL user interface 12. The user specifies the desired programming function by interacting with the 4GL user interface 12 through known means, such as a keyboard 14, mouse 16, or other interface device 18. In this manner, the user constructs a 4GL specification of a program having desired functions in the 4GL language. The 4GL specification is then provided to a generator engine 20 of the generator tool 10. Most traditional generator engines include 3GL source code statements for all potential target languages imbedded therein. Fourth generation language specification statements are matched with corresponding 3GL source code statements in the generator engine 20. Syntax of the 4GLs is preserved in the set of 3GL statements and the resulting set of 3GL source code statements are output. The output 3GL source code statements may comprise a complete program, a portion of a program, or a shell of a program, depending on the complexity of the generator tool 10 and the completeness of the 4GL input from the user.

The problems and limitations associated with such a system have been discussed above. The present invention solves the problems and circumvents the limitations by utilizing object oriented technology throughout the source code generation system, as will now be described with reference to FIGS. 2 through 5.

Figure 2:
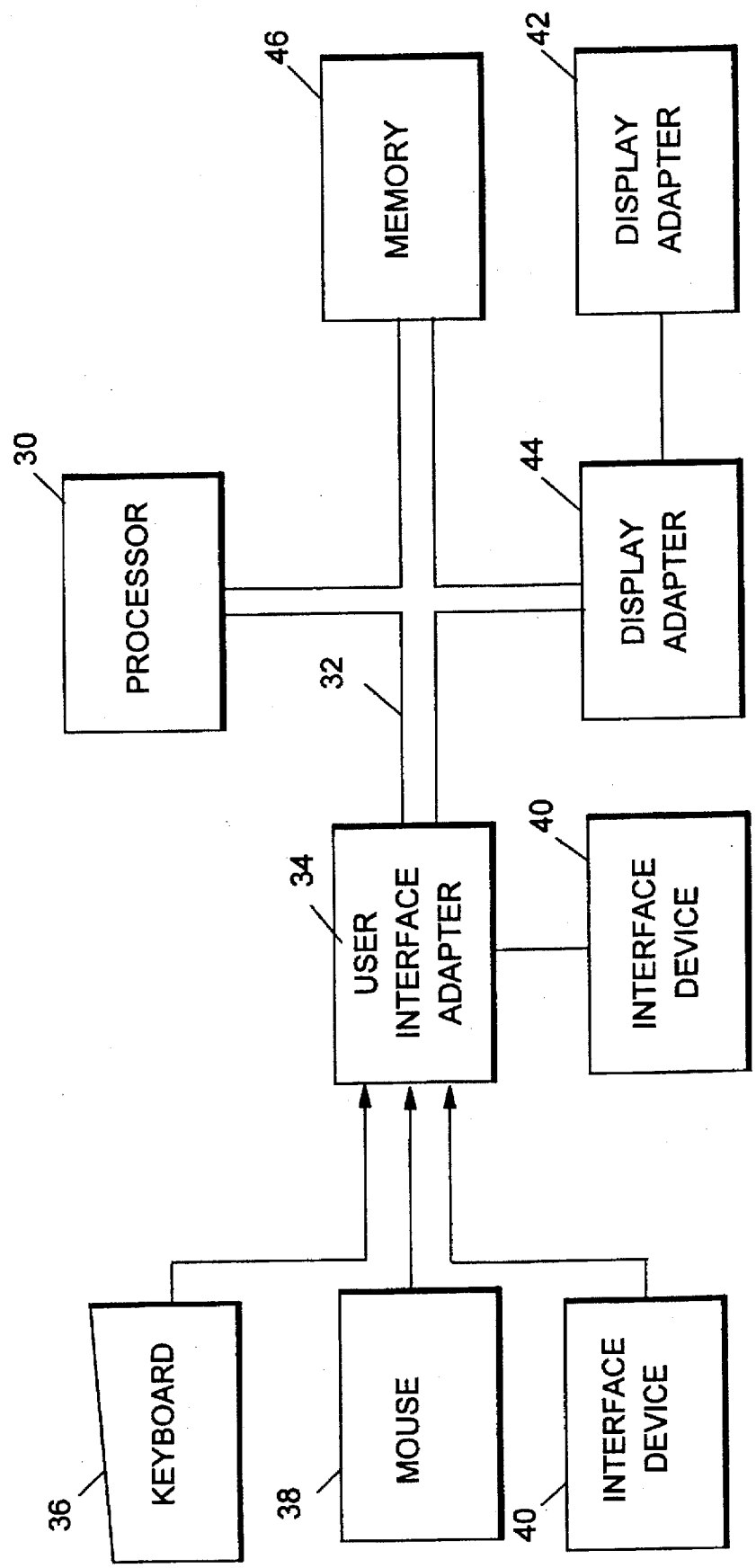
FIG. 2 illustrates a representative computer hardware environment in which the present invention may be practiced.

The present invention can be performed in any of a variety of known computing environments. FIG. 2 illustrates a representative hardware environment in which the present invention may be practiced. The environment includes a processor 30, which may be the microprocessor of a workstation or personal computer or the like. A bus 32 is employed to connect and enable communication between the processor 30 and components of a user station in accordance with known techniques. The user station will typically include a user interface adapter 34, which connects the processor 30 via the bus 32 to one or more interface devices, such as a keyboard 36, a mouse 38, and/or other interface devices 40, which can be any user interface devices, such as a touch sensitive screen, a digitized pen entry pad, etc. The bus 32 also connects a display device 42, such as an LCD screen or a CRT, to the processor 30 via a display adapter 44. The bus 32 also connects the processor 30 to memory 46, which can include ROM, RAM, etc. The described environment of FIG. 2 can be a stand-alone workstation or in a client server environment.

As those skilled in the art are well aware, the present invention will most often be embodied in computer readable code, also known as computer software. The block diagram and flow charts which follow describe the logical steps carried out by a computer executing software having the techniques according to the present invention coded therein. Software program code is typically stored in the memory of a standalone workstation or other computer environment. The software program code may be embodied on any of a variety of known media for use with a data processing system, such as a diskette or CD-ROM. The code may be distributed on such media, or may be distributed to users from the memory of one computer system, over a network of some type, to other computer systems for use by users of such other systems. Such techniques and method for embodying software code on media and/or distributing software code are well known, and will not be further discussed herein.

Figure 3:
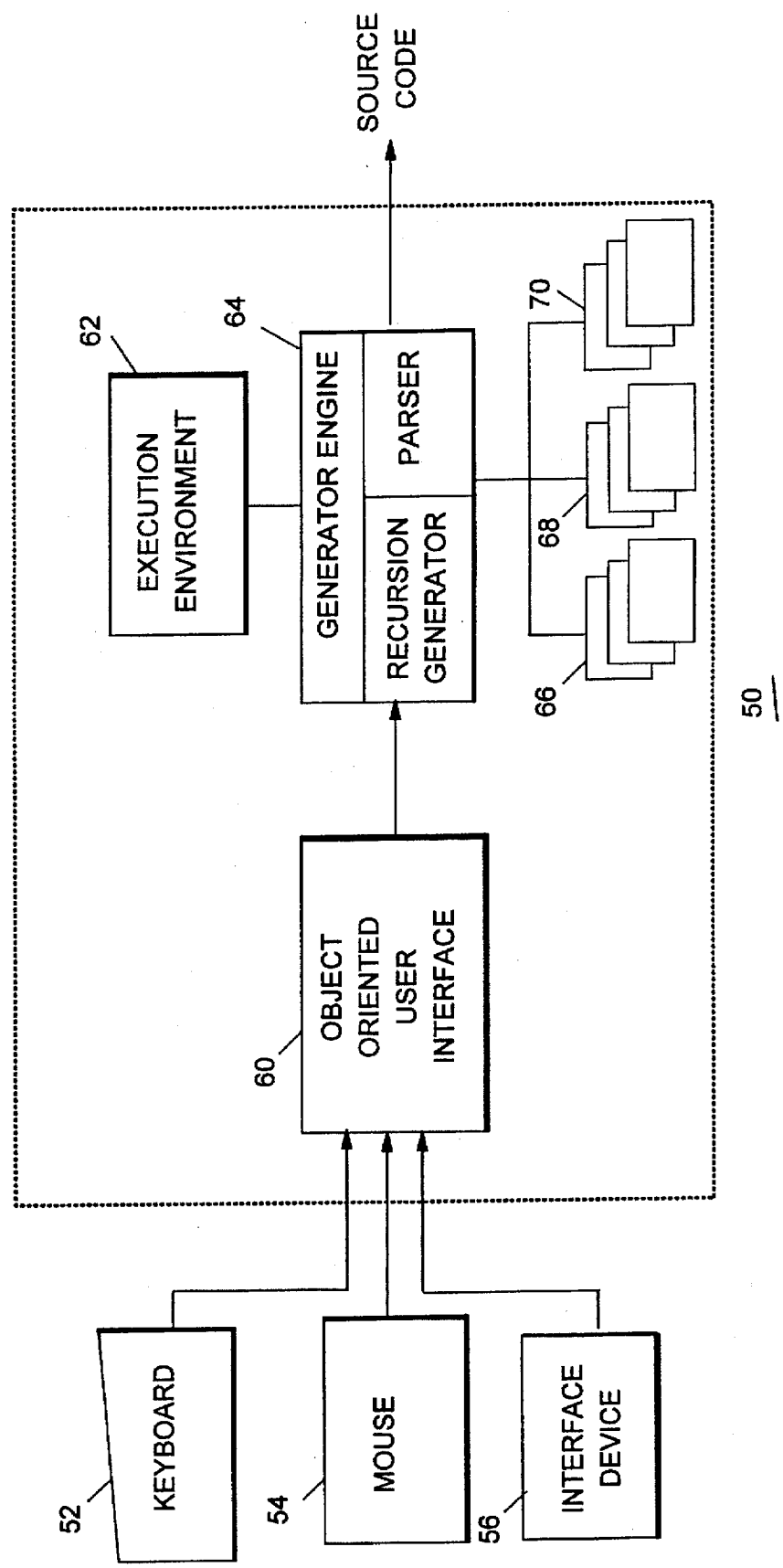
FIG. 3 is a block diagram of a source code generating system which utilizes an object oriented user interface and object oriented generator engine in accordance with the present invention.

FIG. 3 illustrates a block diagram of an implementation of the present invention. A source code generator tool 50 in accordance with the present invention preferably employs an object oriented language in which a user specifies desired program functions and/or entire programs or applications. In the preferred embodiment, the object oriented language is Smalltalk. Smalltalk language development environments are commercially available from a number of different vendors. The tool 50 can be resident in memory 46 of a computing environment of the type described relative to FIG. 2. A user utilizes known input means, such as a keyboard 52, mouse 54 or other user interface device 56 to interact with an object oriented user interface 60. The user interface 60 is typically presented to a user on the display device 42 (FIG. 2). Object oriented user interfaces are known, and are commonly employed for applications or programs which are written in an object oriented language, and are employed with object oriented language development environments. The user manipulates the object oriented interface 60 via one or more of the interface devices 52, 54, 56 to select and combine objects in a manner which represents the desired function.

The user interface 60 may be entirely graphical. In this situation, the user need not know any details of the underlying object oriented language, and would manipulate the interface 60 in virtually the same manner as the user would manipulate the user interface of a 4GL source code generator tool which has a graphical user interface. The difference would be transparent to the user. The technical difference is that the user is not specifying a series of 4GL procedural commands, but rather is defining instances of object oriented classes available through the object oriented user interface 60. Each defined instance of a class is known as an object; the set of objects that the user defines is the object oriented program.

In a different implementation of the object oriented user interface 60, the user can be required to directly manipulate the methods or classes of the underlying object oriented language in order to specify the desired programming function. In this case, the user is actually programming in the object oriented language. This, of course, requires more detailed knowledge of the object oriented language. Alternatively, the object oriented user interface 60 can be a combination of a graphical interface and programming interface. Whichever the case, these are all well-known, as it is well-known for a user of an object oriented language to create object oriented programs or applications using a provided interface, which is precisely what the user is doing with the object oriented user interface 60 of the present invention.

Through the object oriented user interface 60, the user creates an object oriented program which is utilized by the tool 50 as an object oriented model of the desired programming function. The object oriented model is capable of being executed by an appropriate object oriented execution environment. In the preferred embodiment, the underlying object oriented language is Smalltalk, and the necessary execution environment typically comprises an appropriate Smalltalk virtual machine and Smalltalk image. These enable the sending of messages between objects and include and enable execution of basic processing routines and functions represented by the methods contained in the objects. The methods are composed of messages for the objects and, at their most basic level, perform actual processing by causing execution of routines, calling of dynamic link libraries, etc., and provide the appropriate interfacing with the underlying operating system, etc. Since execution of the Smalltalk code in the object oriented model will be necessary in the conversion of the model into target language code, the generator tool 60 preferably includes the necessary elements of a Smalltalk virtual machine and image so that execution may occur. In FIG. 3, an execution environment 62 is illustrated as being included with the tool 50.

The generator tool 50 also includes an object oriented generator engine 64. The generator engine 64 has memory associated therewith, as well as one or more sets of target language specific source code templates, which are also stored in the associated memory or in memory which is accessible by the generator engine 64. The Smalltalk execution environment 62 that permits execution of Smalltalk code is illustrated as being separate from the generator engine 64, although it may be contained within the generator engine 64 itself.

The conversion of the object oriented model into 3GL target language source code will now be described with additional reference to the flow charts of FIGS. 4 and 5.

In FIG. 3, three sets of source code templates 66, 68, 70, are illustrated. One set of source code templates is provided for each target language available through the generator tool 50. Typically, the target language will be a 3GL, such as C or COBOL. The target language may be another 4GL or another object oriented language; however, the discussion below is directed to the situation in which the target language is a 3GL. This architecture permits the source code generator tool 50 to be completely extensible, and practically any number of additional sets of source code templates representing additional target languages may be added relatively easily with minimal effects on performance. Each source code template in each set of templates corresponds to a reserved keyword in the target language. Each keyword corresponds to basic program data or program logic. Since each target language will probably include a different number of base data and logic types, each set of source code templates will typically contain a different number of templates.

Just as important, most objects in the object oriented model will not be primitive objects that will match directly to a base data or logic type as represented by the source code templates. Rather, most objects in the model will be abstract or relatively high level objects that are composed of other objects. Accordingly, a determination must be made relative to each object as to whether or not each object is a primitive object relative to the target language. If an object is not a primitive object, the primitive objects which compose the object must be surmised in order to achieve the necessary mapping to the templates. To reach the primitive level, each non-primitive object will be asked to generate its structure so as to surface the contained objects. The contained objects may be of both the primitive and non-primitive variety. Each non-primitive object will be asked to recursively generate itself. This process will continue until all of the primitive objects which constitute the original object from the model are reached. The concept that an object may contain or actually be composed of a variety of other objects and the process of recursive generation are both known in object oriented technology.

Typically, all the data structures from the object oriented model are mapped to their source code templates first, followed by all of the logic structures. The implementation of the mapping of the primitive constructs to the source code templates while using recursive generation will be described in detail with reference to the flowchart of FIG. 4A–4B.

Figure 4A:
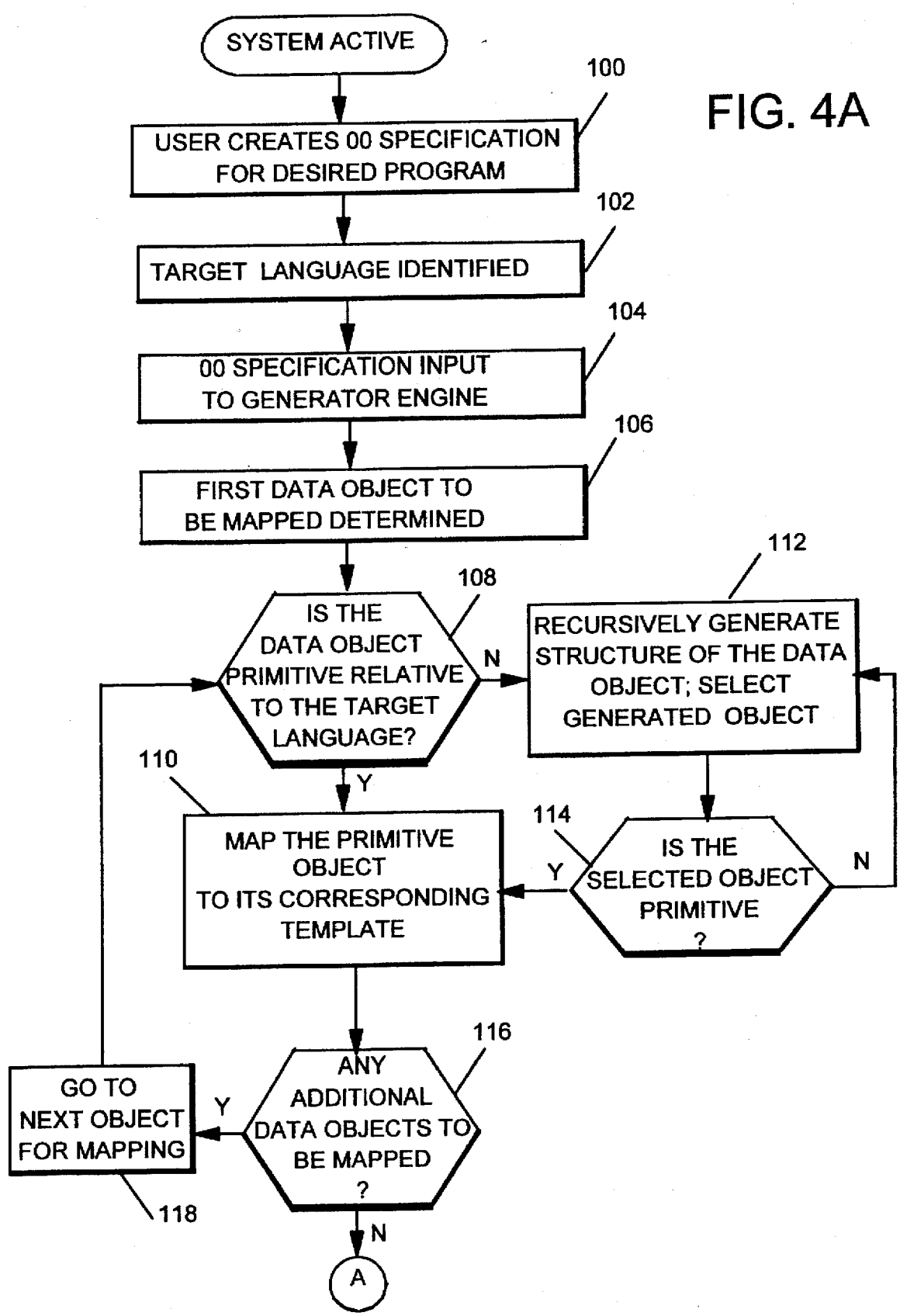
FIGS. 4A and 4B illustrate a flowchart describing how the object oriented specification is processed and converted into the desired target language by the source code generating system of FIG. 3 in accordance with the present invention.
Figure 4B:
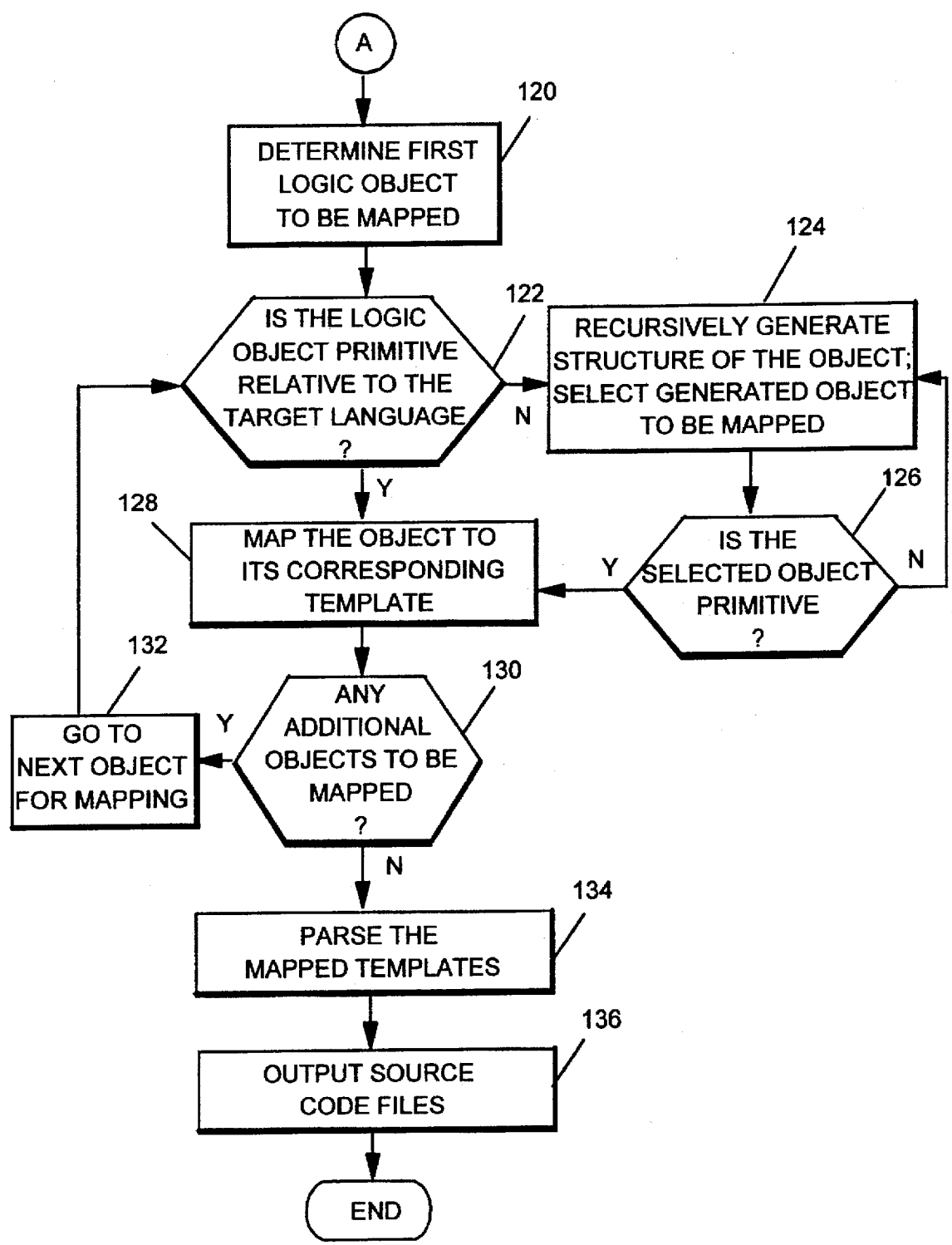
Figure 5A:
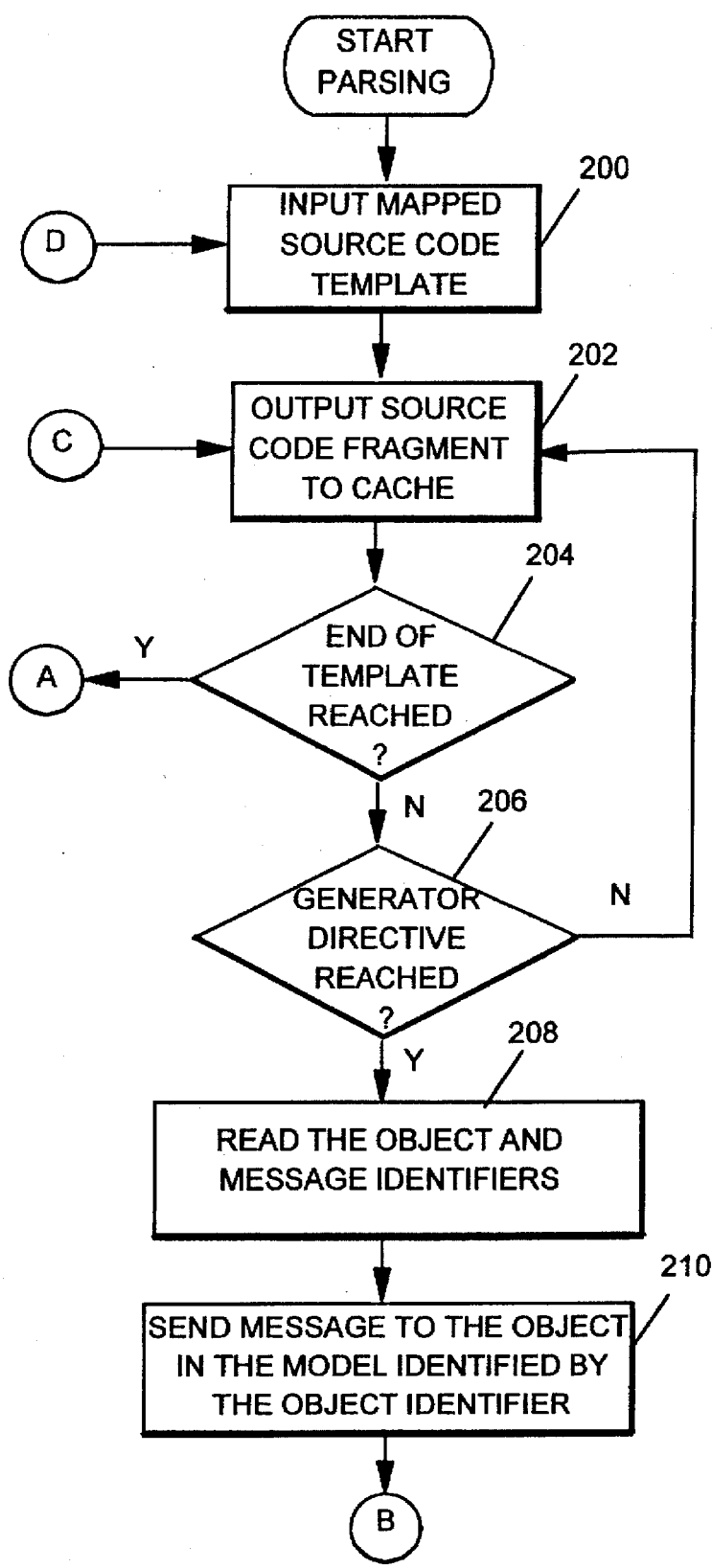
FIGS. 5A and 5B illustrate a flowchart describing the technique employed to parse the mapped source code templates.
Figure 5B:
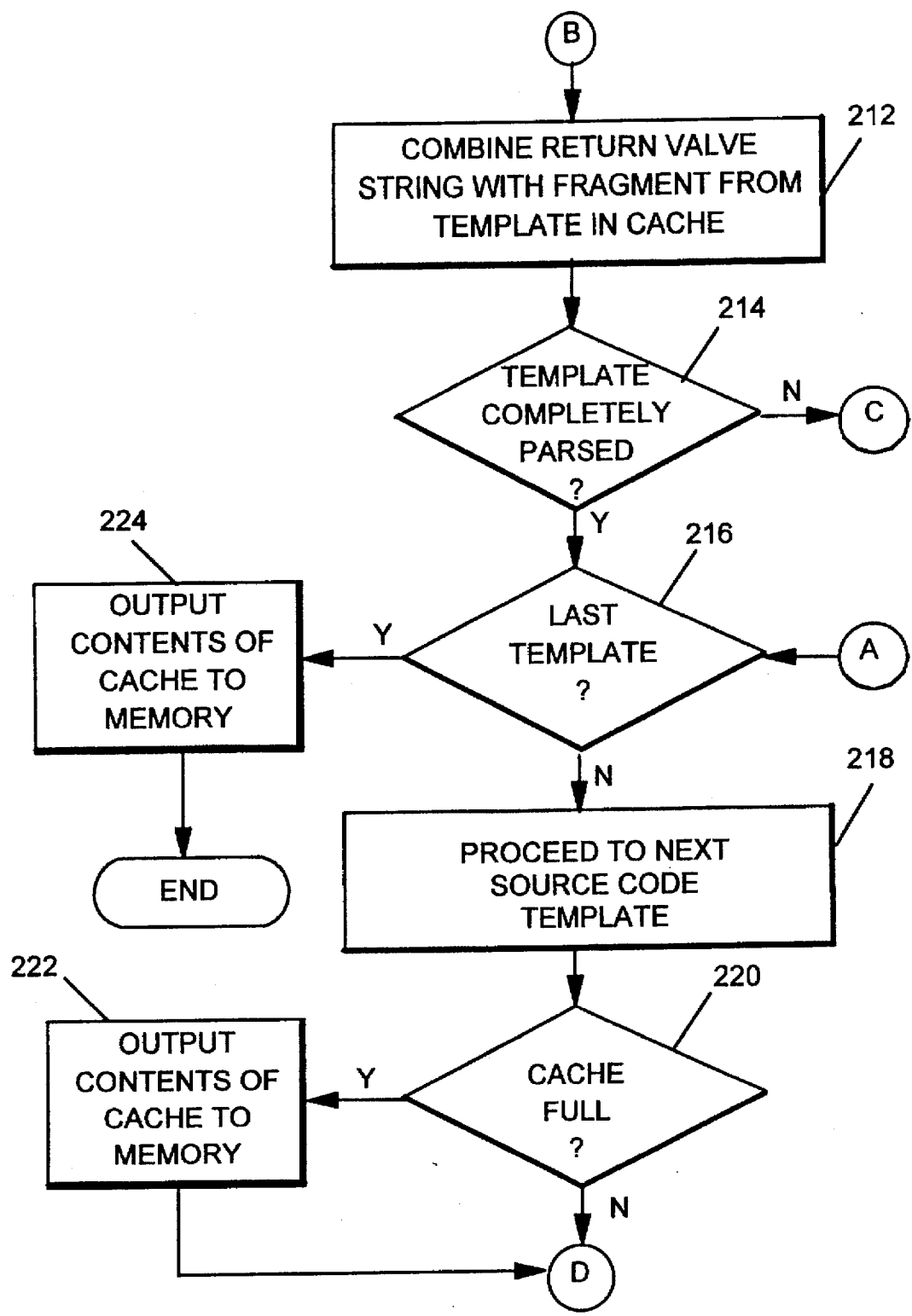

Referring to FIG. 4A–4B, the main processing of the present invention will now be described. In Step 100, a user utilizes the object oriented user interface 60 to create an object oriented specification or model of the desired program or program functions, in a manner as described above. The user also specifies the target language via the user interface 60 (Step 102). The object oriented model is then provided to memory associated with the generator engine 64 (Step 104) for processing by the generator engine 64.

The first data object from the model to be mapped to the source code templates is then selected or determined (Step 106). The order in which the objects are selected for mapping is not critical, since the interrelationships are maintained in the parsing process by the execution of object oriented code relative to the model, as will be discussed below. The generator engine 64 determines whether the selected data object is a non-primitive object relative to the target language (Step 108). This may be accomplished by determining whether the name of the object has a matching counterpart in the set of source code templates for the target language. If it is determined in Step 108 that the object is a primitive object, that object is mapped to its corresponding source code template in Step 110. If it is determined in Step 108 that the object is not a primitive object, then the generator engine 64 causes the object to recursively generate itself to generate the contained objects (Step 112). One of the contained objects is selected, and it is then determined in Step 114 whether the contained object is a primitive object. If the contained object is determined not to be a primitive object, then the processing returns to Step 112, and the object recursively generates itself. As each primitive object is reached, processing proceeds to Step 110 for that primitive object and the primitive data object is mapped to its corresponding source code template. The processing then proceeds to Step 108 for the next contained object, if any. Steps 108, 110, 112 and 114 are repeated until all of the primitive objects which compose the original object from the object model are reached.

After the object from the model has been completely mapped, the processing returns to Step 108 for the next data object from the object oriented model to be processed (Steps 116, 118). When it is determined in Step 116 that all of the data objects from the model have been mapped, the first logic object from the model for mapping is selected or determined (Step 120). It is then determined in Step 122 whether or not the selected logic object is a non-primitive object relative to the target language. If the object is a primitive object, it is mapped to its corresponding template (Step 128). If the object is non-primitive, the object recursively generates its structure (Step 124). It is then determined in Step 126 whether a first of the generated or contained objects is a primitive object or not. For each primitive object, processing proceeds to Step 128 for mapping and then processing proceeds to Step 122 for the next contained object, if any. Steps 122, 124, 126 and 128 are repeated for each contained object until no further non-primitive objects are found. After the last primitive object from the original logic object has been mapped to its corresponding source code template in Step 128, it is determined whether there are any additional logic objects from the model to be mapped (Step 130). If there exists at least one additional logic object from the object oriented model to map, then the next object is selected or determined and the processing described relative to Steps 122–128 is repeated for the next object. When it is finally determined in Step 130 that there are no additional logic objects from the object oriented model that require mapping, the mapped source code templates are parsed by the generator engine 64 in accordance with its parsing algorithm (Step 134) and the resulting source code is output (Step 136). The parsing process will be described in more detail with respect to FIGS. 5A–5B.

In most cases, each source code template will consist of two components, the first being an actual target language source code fragment and the second component being a generator directive which includes, in the preferred embodiment, smalltalk code which executes during the parsing process. The smalltalk code within the generator directive, when executed, provides the generator engine 64 with the appropriate target language string to complete the target language source code fragment supplied by the source code template. Each generator directive is composed of two parts, the first being an object identifier and the second being a message identifier. The object identifier identifies which object from the object oriented model should receive the message represented by the message identifier. During parsing, the message is sent to the identified object utilizing the object oriented execution environment 62, and a return value will be returned from the identified object. The return value is an additional source code fragment, but generally is the VARIABLE portion, such as a variable name, an entry point name, etc. The generator algorithm appends the return value to the source code fragment from the source code template. It is in this way that the objects in the object oriented model participate in the source code generation process. For example, a MoveStatement object responds with a source code fragment that represents the way to reference its SOURCE and TARGET operandi within the various target languages.

As discussed above, processing of each mapped source code template by the generator engine 36 results in a string of actual target language source code. The typical program created using the tool 50 will include a large quantity of such strings. The following is an example of the declaration source code template in the C language for a data-oriented object known as the NumericDataItemObject and called "IdNumber", which represents a numeric data entity in the 4GL specification:

int <self VarName>;

The source code fragment portion of this source code template consists of the strings "int" and ";", while the generator directive is the portion which consists of "<self varName>". The "<" and ">" symbols are arbitrary delineators which indicate the beginning and end of the generator directive. The object identifier in the generator directive is the token "self", which refers to the object being asked to generate itself as a variable declaration, namely "IdNumber". The message identifier is the token "varName", which will be the message sent to the object "self". This message tells the object "self" to return the string representing itself when used in a variable declaration. In this example, the NumericDataItemObject, whose name is "IdNumber", will return the string "idNumber". The resulting target language source code fragment is "int idNumber;", which is a C language source code fragment.

It should be noted that this object could respond with any string, not just its name. This might be necessary, for example, if its name is longer than the allowable length for variable names in the target language.

In summary, the source code template parser processes the language specific source code template against the object oriented model, causes the Smalltalk code within the generator directives to execute, and produces the completed source code string in the target language. The actual parsing of the source code templates will now be described with reference to the flowchart of FIGS. 5A-5B.

In Step 200, one of the source code templates is input to the parser. In Step 202, the source code fragment portion of the source code template is output to cache memory. That is, the content of the source code template is written to the cache until the "<" symbol is reached, which indicates the end of the source code fragment and the beginning of the generator directive, or until the end of the source code template is reached. The latter is likely to occur in complex source code templates when the source code fragment follows an already processed generator directive and no additional source code directive is included in the source code template, or when the source code template includes no generator directive. If it is found that the end of the source code template has been reached (Step 204), then the processing proceeds to Step 216, which will be discussed below. If it is determined that the generator directive has been reached, which occurs when the "<" symbol has been reached (Step 206), the "<" symbol is discarded, and the generator algorithm reads the object and message identifiers which follow which comprise the generator directive (Step 208). The smalltalk code which comprises the identifiers is executed by the execution environment 62. The message identifier is sent as a message to the object in the object oriented model identified by the object identifier (Step 210). The value or text or string which is then returned in response to sending the message is output to the cache. In cache, the return value is combined with the source code fragment portion of the template to extend the target language source code string in cache (Step 212). The ">" symbol is then discarded, and a determination is made as to whether the individual source code template being parsed has been completely parsed (Step 214). If not, the parsing process returns to Step 202, and continues until the source code template is completely parsed. If the source code template has been completely parsed, the parsing process proceeds to Step 216.

If it is determined in Step 216 that the mapped source code template is the last source code template to be parsed, then the parsing process ends. Otherwise, the next source code template for parsing is determined (Step 218) and input to the parser for parsing (Step 200).

The parsing process utilizes the strengths of object oriented technology to maintain the inter-relationships of various components of the desired programming which were originally input in the 4GL. The inter-relationships are maintained in the object oriented model, and forwarded into the target language code by the execution of the smalltalk code, which provide strings which are combined with the source code fragments from the source code templates.

The cache memory is periodically checked to determine whether the cache is full or in danger of overflowing (Step 220). If either condition is found, then the contents of the cache are emptied into source code files for the desired program in the target language (Step 222). Additionally, the contents of the cache will be output to the source code files following the parsing of the last source code template (Step 224).

The collection of source code files output from the cache is ready for further processing, as may be required, and will typically be output from the generator engine 64 (or associated memory) in the form of source code files (Step 136 of FIG. 4B). Third generation language source code will typically require compiling to prepare it for execution. A compiler may be included in the generator tool 50 so that compiling of the output source code automatically occurs. Additionally, other code preparation steps may be included in the generator tool 50. For example, the tool 50 may include a debugger for debugging the code. However, elements such as compilers and debuggers are known components for the creation of executable code, and are not crucial to the operation to the present invention.

The skills required to implement the subject invention are well within the skills of those having ordinary skill in the art. While one embodiment of the invention has been discussed, it will be appreciated by those skilled in the art that various modifications and variations are possible without departing from the spirit and scope of the invention.

I claim:

1. In a computing environment, a system for converting an object oriented program specification into source code for a target language, comprising:

a set of code templates, each code template corresponding to a different construct in the target language and comprising fragments of code;

means for determining whether each object in the object oriented program specification corresponds to one of the constructs, and, if not, recursively generating any non-corresponding object to generate contained objects, and, if necessary, recursively generating the contained objects to find objects which comprise the non-corresponding object which correspond to one of the constructs;

means for mapping each of the corresponding objects to the code templates which corresponds to the corresponding constructs; and means for parsing the mapped code templates to produce source code in the target language.

2. A system according to claim 1, further comprising an object oriented execution environment for enabling execution of object oriented code, wherein each of said code templates further comprise object oriented code and fragments of source code from the target language, and wherein said parsing means further causes the object oriented code in each of the mapped code templates to be executed with said object oriented execution environment relative to the object oriented program specification to generate additional source code fragments and combines the additional source code fragments with the fragments of source code.

3. A system according to claim 1, wherein a plurality of target languages are available for targeting and a set of code templates is provided for each of the target languages.

4. A system according to claim 3, further comprising means for designating a target language, and wherein said mapping means maps each of the corresponding objects to the corresponding one of the code templates from the set of code templates which correspond to the designated target language.

5. A system according to claim 1, wherein the constructs are base logic and data components of the target language.

6. A system for converting an object oriented program into code for a target language, comprising:

a set of code templates corresponding to each available target language, each of the code templates comprising code fragments in the corresponding target language and object oriented code and each of the code templates corresponding to a different construct in the corresponding target language;

an object oriented execution environment capable of executing the object oriented code;

means for recursively generating each object in the object oriented program as necessary to find all underlying objects which correspond to the code templates for the target language;

mapping means for mapping each of the underlying objects to the corresponding code template for the target language; and means for parsing the mapped code templates to generate code in the target language.

7. A system according to claim 6, wherein said means for parsing extracts the code fragments from each mapped code template, executes the object oriented code in each mapped code template to produce an additional code fragment, combines the additional code fragment and the code fragments, and outputs the combined code.

8. A system according to claim 6, wherein each of the constructs corresponds to a logic keyword or data keyword in the corresponding target language.

9. A system according to claim 6, wherein said system further comprises means for designating the target language into which the object oriented program is to be converted.

10. A method for converting an object oriented program into a target language, comprising the steps of:

recursively generating objects from the object oriented program, as necessary, to identify all base objects which have a corresponding source code template for the target language;

mapping each of the base objects to the corresponding source code template; and parsing the mapped source code templates to generate source code in the target language.

11. A method according to claim 10, wherein the source code templates comprise a target language source code portion and an object oriented code portion, and wherein said parsing step causes the object oriented code portion of each of the source code templates to be executed and combines any response to the execution of the object oriented code portion with the target language source code portion, and outputs the combined response and source code portion.

12. A method according to claim 10, wherein a plurality of target languages are available and a set of source code templates is associated with each of the target languages, and said method further comprises the step of designating the target language into which the object oriented program is to be converted.

13. Computer readable code for converting object oriented code into target language code, comprising:

at least one set of source code templates;

first subprocesses for recursively generating objects from the object oriented code, as necessary, to identify all base objects which have a corresponding source code template in a target set of source code templates;

second subprocesses for mapping each of the base objects to the corresponding source code template; and third subprocesses for parsing the mapped source code templates to generate source code.

14. Computer readable code for converting object oriented code according to claim 13, wherein the source code templates comprise a target language source code portion and an object oriented code portion, and wherein said third subprocesses further cause the object oriented code portion of each of the source code templates to be executed and combined in response to the execution of the object oriented code portion with the target language source code portion, and output the combined response and source code portion.

15. Computer readable code for converting object oriented code according to claim 13, wherein a plurality of target languages are available and a set of source code templates is associated with each of the target languages, said computer readable code further comprising fourth subprocesses for designating the target language into which the object oriented code is to be converted.

* * * * *